United States Patent [19]

Baumgarte et al.

[11] 3,883,299
[45] May 13, 1975

[54] DYEING AND PRINTING TEXTILES WITH VAT DYES USING REDUCTONES AND/OR REDUCTONATES

[75] Inventors: Ulrich Baumgarte; Siegfried Weigold, both of Limburgerhof; Werner Scheuermann, Ludwigshafen, all of Germany

[73] Assignee: Badische Anilin- & Soda-Fabrik Aktiengesellschaft, Ludwigshafen (Rhine), Germany

[22] Filed: Dec. 20, 1972

[21] Appl. No.: 316,865

[30] Foreign Application Priority Data
Dec. 24, 1971   Germany...................... 2164463

[52] U.S. Cl. ................................. 8/34; 8/37; 8/70; 8/88; 8/54.2
[51] Int. Cl. ............................................. D06p 1/24
[58] Field of Search .............. 8/34, 37, 70, 88, 54.2

[56] References Cited
UNITED STATES PATENTS

| | | | |
|---|---|---|---|
| 2,598,120 | 5/1952 | Griffith | 8/34 X |
| 3,122,409 | 2/1964 | Bardt | 8/34 |
| 3,454,347 | 7/1969 | Leimbacher | 8/34 X |
| 3,464,780 | 9/1969 | Weber et al. | 8/34 |
| 3,758,272 | 9/1973 | Datye et al. | 8/174 X |

OTHER PUBLICATIONS

Kneicht et al., Principles & Practice of Textile Printing, Charles Griffin & Co., Ltd., London, England, 1952, pp. 268 & 269.

*Primary Examiner*—Benjamin R. Padgett
*Assistant Examiner*—P. A. Nelson
*Attorney, Agent, or Firm*—Johnston, Keil, Thompson & Shurtleff

[57]  ABSTRACT

Process for dyeing and printing textile material with vat or sulfur dyes using reductones or reductonates at pH about 12 or more in the presence of a quinoid compound which is soluble in water in the said pH range, and dye formulations which contain reductones or reductonates as reducing agents. The reducing agents are resistant to atmospheric oxygen and do not cause any overreduction in the case of sensitive dyes.

12 Claims, No Drawings

DYEING AND PRINTING TEXTILES WITH VAT DYES USING REDUCTONES AND/OR REDUCTONATES

The invention relates to the dyeing and printing of textiles with vat dyes or sulfur dyes using reductones and/or reductonates.

In the simplest case, reductones are enediols but in more general terms they are compounds having a similar structure to enediols and which are derived from enediols by replacement of one or both of the hydroxyl groups by amino groups and/or sulfhydryl groups. Reductonates are compounds which under the influence of sufficiently strong proton acceptors are converted into enediolate anions. Reductones and reductonates may therefore be represented by the general formula:

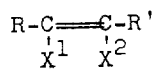

in which $X^1$ and $X^2$ are identical or different and are OH, $O^{(-)}$, $NH_2$, NHR and SH;

R and R' are identical or different and are H, alkyl, hydroxyalkyl, for example $CH_2OH$, —COOH, esterified —COOH,

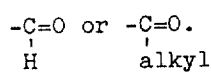

The enediol or enediolate grouping may form part of a ring system so that R and R' form together bridging members of the following type:
—$CH_2$—$CH_2$—CO—, —$CH_2$—O—CO—,

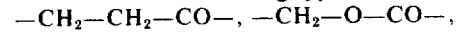

or —NH—CO—NH—CO—
in which R'' is alkyl or substituted alkyl such as —CHOH—$CH_2OH$ in the case of ascorbic acid. The said grouping may also be part of an aromatic ring system, for example in the case of pyrocatechol or pyrogallol in which the bridging member is —CH=λ CH—CH=CH— or

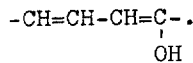

Examples of typical reductones and reductonates are hydroxyacetone, dihydroxyacetone, glycol aldehyde, dihydroxybutanone, 2,3-dihydroxyacrylaldehyde known as triosereductone, ascorbic acid, cyclopentenediolone known as reductic acid and the ethyl ester of α-amino-β-ketobutyric acid. Triosereductone and reductic acid are obtained by acid or alkaline degradation of saccharides or polysaccharides such as glucose, starch, molasses and pectin.

Reductones and reductonates have already been used in printing with vat dyes but either unsatisfactory results have been achieved or a purpose other than reduction has been aimed at. Attempts have been made to use the compounds as reducing agents together with sodium carbonate and sodium bicarbonate in textile printing. The results were not viable because of the inferior reductive effect. The results are also unsatisfactory when the compounds are used together with caustic soda solution and borax. On the other hand the compounds have been used in combination with sodium dithionite (hydrosulfite) or sulfinic acid derivatives for example in order to avoid overreduction of sensitive dyes or to achieve stabilization of the system against atmospheric oxygen. The use of inorganic reducing agents has often met with criticism recently because waste water problems may be encountered.

We have now found that textiles can be dyed and printed with vat dyes or sulfur dyes more advantageously by using as reducing agent a reductone and/or reductonate in a pH range of from 12 upward in the presence of a quinoid compound which is soluble in water in this pH range and preferably an anthraquinone derivative.

Reductones and reductonates to be used in the process of this invention are the compounds described above. Where the compounds do not exhibit the said structure in the neutral range, they achieve it in the alkaline range.

As may be seen from the above lists, the reductones and reductonates (hereinafter referred to as reducing agents for short) are mainly α-hydroxycarbonyl compounds. For reasons of economy those reducing agents are preferred which are readily accessible such as hydroxyacetone, triosereductone obtainable from the degradation of saccharides or polysaccharides or reductic acid.

Examples of quinoid compounds are derivatives of benzoquinone, naphthoquinone, acenaphthenequinone or anthraquinone containing chlorine, hydroxy, carboxylic and/or sulfonic acid groups, for example tetrachloro benzoquinone, 1,4-naphthoquinone, 2,6-hydroxyanthraquinone, 2,7-dihydroxyanthraquinone and 1,4-dihydroxyanthraquinone, anthraquinone carboxylic acids, anthraquinone sulfonic acids such as anthraquinone-2-sulfonic acid, anthraquinone2,6-disulfonic acid, anthraquinone-2,7-disulfonic acid and 1,4-diamino-anthraquinone-2-sulfonic acid. Because of their action these compounds may also be termed reduction catalysts or accelerators. Mixtures of the said compounds may also be used.

The process of the invention may be carried out in the pH range from about 12 upward, but a pH of from 13 upward is preferred.

In addition to anthraquinonoid dyes, the cobalt phthalocyanines and indigoid dyes are included under vat dyes for the purposes of the present invention.

The reducing agent is generally used in an amount of at least 100% by weight based on 100% (pure) dye. About 0.1 to about 10%, preferably from about 2 to about 5%, by weight based on reducing agent may be used as accelerator. A larger excess of accelerator does not do any damage. It should be remembered that the said minimum amounts of reducing agent and accelerator are only guiding values because they depend on the individual dye, pH and concentration of the dye liquor, the dyeing temperature and also the particular reducing agent and accelerator. The most advantageous amounts may be ascertained by preliminary experiment by preparing for the chosen method test colorations under otherwise constant conditions with different reducing agents and accelerators and evaluating the results. Measurements of vatting speeds under standardized conditions are also informative.

The reducing agents may be used in all conventional dyeing methods with vat dyes and sulfur dyes, i.e. in dyeing from a dye liquor, for example in package and jigger dyeing, and in continuous methods, for example pad-steam methods.

In optimum procedures the vatting may take place at low temperatures, for example at room temperature, so that the dyeing temperature depends only on the affinity of the dye. For dyeing from a liquor it is convenient to aim at the lowest possible final temperature so as to increase the color yield; it may be necessary during dyeing to use higher temperatures in order to produce level dyeings. The said reducing agents permit the use of high dyeing temperatures of about 100°C and even those above 100°C without complications (for example by overreduction).

The process of this invention is also suitable for continuous dyeing methods which comprise applying the dye in pigmentary form to textile sheet material, giving an intermediate drying, applying a chemical liquor containing reducing agent, developing at elevated temperatures, for example in an atmosphere of steam at 100°C, and finishing off.

Similar considerations apply to printing with vat dyes or sulfur dyes, for example printing the dye in a print paste containing a conventional thickening agent, intermediate drying, applying a padding liquor containing a reducing agent and developing in a steamer suitable for two phase printing, finishing off being carried out conventionally by rinsing, oxidizing and soaping.

The usefulness of the reducing agents is not exhausted by the description of the procedures; rather the reducing agents also offer the possibility of commercial forms not hitherto realizable. Thus for example liquid dye formulations may be introduced into commerce which contain vat dye, reducing agent and accelerator and are adjusted to be acid or neutral. They remain stable until they are made alkaline immediately prior to use. Dye pastes and powdered dyes which have been adjusted to be acid or neutral may also be marketed which contain dye, solid reducing agent and accelerator, if desired with dispersing agent and diluent.

The advantages of this invention, including those already described above, may be summarized as follows: high resistance of the reducing agent to atmospheric oxygen so that formulations can be produced which have a long shelf life; no undesirable reduction of the dye in acid or neutral medium; no overreduction of sensitive vat dyes, for example in the case of an indanthrone derivative; some of the reducing agents are liquid and may therefore be dosed easily; the reducing agents are not electrolytes in the proper sense and therefore do not offer any leveling problems.

Since the reductones and reductonates and their oxidation products formed in the liquor on vatting are biologically degradable these dye liquors are more acceptable from an environmental point of view than liquors which contain dithionite or oxidation products thereof formed in vatting.

It is preferred to use caustic soda solution to achieve an alkaline range; caustic potash solution is also suitable.

The following Examples illustrate the invention.

EXAMPLE 1

Rayon yarn on cheeses is treated in a commercial yarn-dyeing apparatus at a liquor ratio of 15:1 with a liquor of the following composition:

| | |
|---|---|
| 1 | part of the dye C.I.Vat Green 1 (Colour Index (1956) No. 59825) |
| 40 | parts of aqueous sodium hydroxide solution (38° Baume) |
| 3 | parts of dihydroxyacetone |
| 0.03 | part of 2-hydroxyanthraquinone |
| 955.97 | parts of water |
| 1000.00 | parts. |

The temperature is raised from 25°C and to 60°C in 15 minutes. Dyeing is continued for another 30 minutes at this temperature. Finishing off is carried out as usual. A very level dyed cotton yarn is obtained which is not inferior in color yield and fastness properties to conventional dyeings with hydrosulfite as reducing agent.

EXAMPLE 2

Unbleached cotton yarn on cheeses is treated on a commercial high temperature dyeing apparatus at a liquor ratio of 15:1 at 20°C with a liquor of the following composition:

| Parts | |
|---|---|
| 0.5 | of the dye C.I.Vat Blue 6 (Colour Index (1956) No. 69,825) |
| 40 | of aqueous sodium hydroxide solution (38° Baume) |
| 1 | of hydroxyacetone |
| 3 | of the sodium salt of ethylenediaminotetraacetic acid |
| 0.05 | of sodium anthraquinone-2-sulfonate |
| 955.45 | of water |
| 1000.00 | |

The liquor is heated to 115°C within 30 minutes. Dyeing is continued for another 45 minutes at 115°C, the liquor allowed to cool to 70°C and the dyeing finished off in the usual manner. A level blue dyed material is obtained showing very good penetration and very good fastness properties without any loss of dye by overreduction.

EXAMPLE 3

Cotton yarn on cheeses is dyed on a conventional dyeing apparatus at a liquor ratio of 10:1 at 80°C with a liquor of the following composition:

| | |
|---|---|
| 4 | Parts of the dye C.I.Vat Blue 4 (Colour Index (1956) No. 69800) |
| 40 | parts of aqueous sodium hydroxide solution (38° Baume) |
| 8 | parts of glucose |
| 0.2 | part of 2-hydroxyanthraquinone |
| 947.8 | parts of water |
| 1000.0 | parts |

After a dyeing time of 60 minutes the dyeing is finished off as usual. A textile material is obtained which shows good penetration without any loss of dye occurring by overreduction.

EXAMPLE 4

Previously cleaned and bleached cotton poplin is padded at 25°C in a conventional two-roll padding machine with

| | |
|---|---|
| 50 | parts of the dye C.I.Vat Green 1 (Colour Index (1965) No. 59825) |
| 950 | parts of water |
| 1000 | parts. |

The impregnated cloth is then given an intermediate drying by a continuous method at 120°C, padded in a conventional two-roll padding mangle at 25°C with

```
  80  parts of aqueous sodium hydroxide solution (38° Be)
  30  parts of glucose solution (50%)
   1  part of 1,4-diaminoanthraquinone-2-sulfonic acid
 889  parts of water
1000  parts
``` and steamed at 103°C for 60 seconds in a continuous steamer and finally finished off as usual. A satisfactory dyeing is obtained which is even at the ends and on both sides.

EXAMPLE 5

Bleached cotton yarn is treated on cheeses in a conventional yarn-dyeing apparatus at a liquor ratio of 15:1 with a liquor of the following composition:

```
    2       parts of the dye C.I.Vat Orange 3
            (Colour Index (1956) No. 59300)
   40       parts of aqueous sodium hydroxide solution (38°
            Be)
    3       parts of hydroxyacetone
   20       parts of sodium sulfate (anhydrous)
    0.06    part of 2-hydroxyanthraquinone
  934.94    parts of water
 1000.00    parts.
```

Dyeing is continued for 60 minutes at 24°C and the dyeing is then finished off as usual. A level satisfactory dyeing is obtained having good fastness at a color strength which is noticeably higher than in the usual vat dyeing by the IK-process.

EXAMPLE 6

Previously cleaned and bleached cotton twill is padded at 25°C in a conventional two-roll padding mangle with

```
  25  parts of the dye C.I. Vat Black 25
      (Colour Index (1956) No. 69525)
 975  parts of water
1000  parts.
```

The liquor pickup should not exceed 80%. The dyeing is then steamed for 60 seconds at 103°C in a conventional steamer which is fitted with a booster for the method known as the wet steam method.

The textile material is treated in the booster with a solution of the following composition:

```
 100      parts of aqueous sodium hydroxide solution
          (38° Be)
  25      parts of hydroxyacetone
   0.5    part of 2-hydroxyanthraquinone
 874.5    parts of water
1000.0    parts.
```

The dyeing is finished off as usual. A cloth showing very good penetration is obtained with a high color yield.

EXAMPLE 7

A cotton cloth is printed with the following print paste:

```
 100  parts of a yellow vat dye, e.g., C.I.Vat Yellow
      1 (Colour Index (1956) No. 70600) in the form of a
      20% aqueous paste
 100  parts of water
 600  parts of a 3% decoction of carob bean flour
 200  parts of a 10% wheat starch paste
1000  parts.
```

After the cloth has been printed and dried it is treated with:

```
 744  parts of water
  50  parts of sodium hydroxide
 200  parts of glucose (50%)
   1  part of anthraquinone-2-sulfonic acid
   5  parts of sodium tetraborate
1000  parts.
```

While still moist the cloth is exposed for thirty seconds to an atmosphere of steam devoid of air and without superatmospheric pressure at 120°C. To finish off the cloth it is treated for 2 minutes in running water at 20°C and for 2 minutes in an aqueous solution containing 2 g of sodium perborate per liter which is at 95°C, oxidized, soaped, rinsed and dried. A yellow print is obtained on a white ground.

EXAMPLE 8

Bleached cotton yarn on cheeses is dyed in a conventional dyeing apparatus at a liquor ratio of 10:1 at 80°C with a liquor of the following composition:

```
  10  parts of the dye formulation described below
  40  parts of aqueous sodium hydroxide solution (38 Be)
 950  parts of water
1000  parts.
```

The dye formulation consists of:

```
  20    parts of the dye C.I.Vat Blue 14 (Colour Index
        (1956) No. 69810)
  10    parts of naphthalenesulfonic acid condensed with
        formaldehyde
  40    parts of hydroxyacetone
   0.1  part of 2-hydroxyanthraquinone and
   9.9  parts of water. The aqueous dispersion should
        have a pH of from 4 to 5.
```

After a dyeing period of 60 minutes the yarn is finished off as usual. A brilliant blue dyeing is obtained with an excellent color yield and very good fastness properties.

EXAMPLE 9

```
   3       parts of the dye C.I.Vat Blue 43 (Colour Index
           (1956) No. 53,630) is made into a paste with
  20       parts of an aqueous sodium hydroxide solution
           (38 Be) and after fifteen minutes is introduced
           into a solution at 70°C, of
   6       parts of glucose
   0.03    part of 2,6-dihydroxyanthraquinone and
 970.97    parts of water
1000.00    parts.
```

Five minutes later cotton yarn on cheeses is dyed with this liquor in a conventional yarn-dyeing apparatus at a liquor ratio of 10:1 at 70°C. After a dyeing period of 60 minutes the yarn is finished off as usual. A blue dyeing typical of this dye is obtained having good fastness properties.

EXAMPLE 10

Previously cleaned and bleached cotton cloth (basket weave) is padded at 25°C in a two-roll padding machine with

| | |
|---|---|
| 25 | parts of the dye C.I.Vat Blue 6 (Colour Index (1956) No. 69825) in |
| 975 | parts of water |
| 1000 | parts. |

Liquor pickup is 90%. The impregnated cloth is then intermediately dried at 120°C by a continuous method. The padded cloth is then impregnated at 25°C in a two-roll padding mangle with the following reducing agent liquor:

| | |
|---|---|
| 80 | parts of aqueous sodium hydroxide solution (38° Be) |
| 14 | parts of hydroxyacetone |
| 1.4 | parts of chloranil (tetrachlorobenzoquinone) and |
| 904.6 | parts of water |
| 1000.0 | parts. |

The impregnated cloth is steamed for 60 seconds at 103°C in saturated steam in a steamer and then finished off as usual.

A satisfactory blue dyeing is obtained whose depth of color is clearly greater than that of a dyeing which has been prepared in the absence of chloranil.

We claim:

1. A process of dyeing or printing cellulose textiles with vat dyes in a pH range from about 12 upward wherein hydroxyacetone, dihydroxyacetone, glycol aldehyde, dihydroxybutanone, 2,3-dihydroxyacrylaldehyde (triosereductone), ascorbic acid, cyclopentenediolone (reductic acid), ethyl α-amino-β-ketobutyrate or a mixture of two or more of these is used as reducing agent in the presence of a quinoid compound which is soluble in water within the said pH range.

2. A process as claimed in claim 1 wherein at least 100% by weight of reductone and/or reductonate is used based on pure dye.

3. A process as claimed in claim 1 wherein from 0.1 to 10% by weight of quinoid compound is used based on reducing agent.

4. A process as claimed in claim 1 wherein from 2 to 5% by weight of quinoid compound is used based on reducing agent.

5. A process as claimed in claim 1 wherein the process is carried out at a pH of 13 or more.

6. A process as claimed in claim 1 carried out at a temperature of from room temperature to about 100°C.

7. A process for dyeing or printing cellulosic textiles with vat dyes in a pH range from about 12 upward wherein hydroxyacetone, dihydroxyacetone, glycol aldehyde, dihydroxybutanone, 2,3-dihydroxyacrylaldehyde (triosereductone), ascorbic acid, cyclopentenediolone (reductic acid), ethyl α-amino-β-ketobutyrate or a mixture of two or more of these is used as reducing agent in the presence of a benzoquinone, a naphthoquinone, an anthraquinone or a mixture thereof each of which bears one or more of the substituents: chlorine, amino, carboxyl and sulfonic acid, said quinoid compound being soluble in water in the said pH range.

8. A process for dyeing or printing cellulosic textiles as set forth in claim 7 wherein hydroxyacetone, dihydroxyacetone, glycol aldehyde, dihydroxybutanone, 2,3-dihydroxyacrylaldehyde (trisereductone), ascorbic acid, cyclopentenediolone (reductic acid), ethyl α-amino-β-ketobutyrate or a mixture of two or more of these is used as reducing agent in the presence of at least one quinoid compound selected from the group consisting of 2-hydroxyanthraquinone, 2,6-dihydroxyanthraquinone, 2,7-dihydroxyanthraquinone, 1,4-dihydroxyanthraquinone, anthraquinone-2-carboxylic acid, anthraquinone-2-sulfonic acid, anthraquinone-2,6-disulfonic acid, anthraquinone-2,7-disulfonic acid, 1,4-diaminoanthraquinone-2-sulfonic acid, tetrachlorobenzoquinone and 1,4-naphthoquinone.

9. A composition of matter comprising a vat or sulfur dye which has been made ready for use by adjustment of the pH to about 12 or more, a reducing agent selected from the group consisting of hydroxyacetone, dihydroxyacetone, glycol aldehyde, dihydroxybutanone, 2,3-dihydroxyacrylaldehyde (triosereductone), ascorbic acid, cyclopentenediolone (reductic acid), ethyl α-amino-β-ketobutyrate or a mixture of two or more of these and a quinoid compound as an accelerator which is soluble in water at least within the said pH range.

10. A composition of matter as set forth in claim 9 in which said reducing agent is selected from the group consisting of hydroxyacetone, dihydroxyacetone, glycol aldehyde, dihydroxybutanone, 2,3-dihydroxyacrylaldehyde (triosereductone), ascorbic acid, cyclopentenediolone (reductic acid), ethyl α-amino-β-ketobutyrate or a mixture of two or more of these and said quinoid compound is selected from the group consisting of 2-hydroxyanthraquinone, 2,6-dihydroxyanthraquinone, 2,7-dihydroxyanthraquinone, 1,4-dihydroxyanthraquinone, anthraquinone-2-carboxylic acid, anthraquinone-2-sulfonic acid, anthraquinone-2,6-disulfonic acid, anthraquinone-2,7-disulfonic acid, 1,4-diaminoanthraquinine-2-sulfonic acid, tetrachlorobenzoquinone and 1,4-naphthoquinone.

11. A process as set forth in claim 1 wherein hydroxyacetone is used as the reducing agent.

12. A composition of matter as set forth in claim 9 wherein said reducing agent is hydroxy acetone.

* * * * *